(12) United States Patent
Wagenbach

(10) Patent No.: US 7,774,944 B1
(45) Date of Patent: Aug. 17, 2010

(54) SAW BLADE ADAPTOR AND HOLDER

(76) Inventor: Donald Wagenbach, 13935 Highway 99, Burlington, IA (US) 52601

( * ) Notice: Subject to any disclaimer, the term of this patent is extended or adjusted under 35 U.S.C. 154(b) by 917 days.

(21) Appl. No.: 11/306,344

(22) Filed: Dec. 23, 2005

Related U.S. Application Data

(60) Provisional application No. 60/639,377, filed on Dec. 27, 2004.

(51) Int. Cl.
*B23D 49/16* (2006.01)
(52) U.S. Cl. .................. 30/392; 30/340; 83/699.21
(58) Field of Classification Search .................. 30/340, 30/342, 392, 394, 337, 339; 606/167, 176, 606/177, 178, 180; 348/79, 141; 83/699.21, 83/30, 698.11, 697
See application file for complete search history.

(56) References Cited

U.S. PATENT DOCUMENTS 4,864,727 A * 9/1989 Chu ........................ 30/272.1
5,552,822 A * 9/1996 Nallakrishnan ............... 348/79
5,848,474 A * 12/1998 Fortney et al. ................ 30/392
6,295,736 B1 * 10/2001 Dassoulas et al. ............. 30/392

* cited by examiner

*Primary Examiner*—Kenneth E. Peterson
*Assistant Examiner*—Phong Nguyen
(74) *Attorney, Agent, or Firm*—James C. Nemmers; Shuttleworth & Ingersoll, PLC

(57) ABSTRACT

An adaptor for attaching new, worn or broken blades to reciprocating saws. The adaptor has a slot wide enough to accommodate the working portion of the blade and includes a clamping member to clamp the blade in the slot. Since the blades are slightly flexible, the slot has a height slightly greater than the thickness of the blade, and the clamping member, such as a threaded member with a rounded end, will clamp and hold the blade by forcing it downwardly into a recess while forcing the edges of the blade upwardly into the upper shoulders of the slot. The adapter is provided with a tongue that allows the adapter to fit most, if not all, presently available saws.

4 Claims, 2 Drawing Sheets

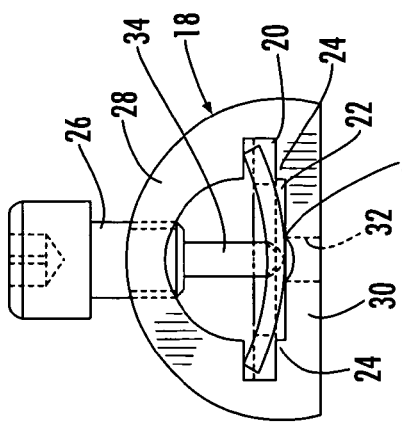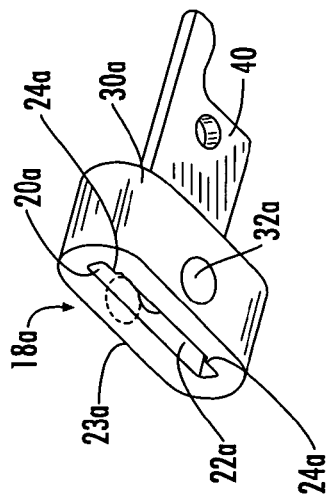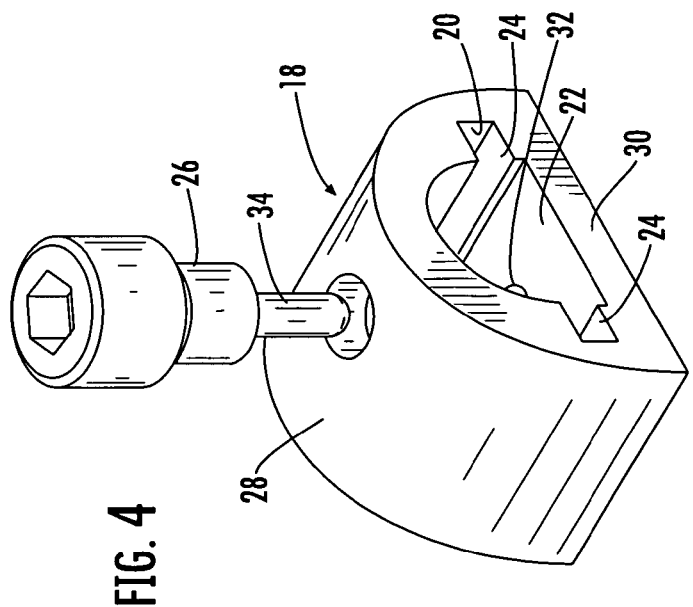

SAW BLADE ADAPTOR AND HOLDER

This application claims the benefit of provisional patent application No. 60/639,377 filed Dec. 27, 2004.

BACKGROUND OF THE INVENTION

Power driven reciprocating saws are used extensively by carpenters, contractors, etc. They are also used by do-it-yourself homeowners. These saws are used for a variety of purposes such as plunge cutting, pipe cutting, demolition into metal, wood, fiberglass, cast iron, as well as other materials. In the typical well-known saw, blades can be changed by loosening a locking member, such as a hex nut or quick lock device, which has a shank that extends through a hole on the inner end of the blade. The shank is withdrawn from the hole to release the blade which can then be removed and a new or different blade inserted with the locking member being extended until the shank extends through the blade opening. The blade is usually held in a blade holder that has a slot the width of the non-working end of the blade, and some means is typically provided so that when the blade is inserted in the slot, the hole in the blade is aligned with the hole in the blade holder. Typically, a stop is provided by a shoulder on the blade formed because the non-working end of the blade is of a reduced width.

With the known arrangement for holding blades for reciprocating saws, it is not uncommon for the blades to break along a line near where the blade narrows to fit into the slot of the blade holder. When this occurs, the blade must then be discarded because there is no way to hold the blade. Since reciprocating saws are used in rugged applications, it is not uncommon for blades to fracture frequently, and certainly they fracture long before the teeth in the blade are sufficiently dulled or require replacement. The cost of blade replacement for a contractor who uses reciprocating saws with great frequency is not insubstantial.

There is therefore a need for an improved method of holding blades for reciprocating saws.

SUMMARY OF THE INVENTION

The invention is for an adaptor for attaching new, worn or broken blades to reciprocating saws. The adaptor has a slot wide enough to accommodate the working portion of the blade and includes means to clamp the blade in the slot. Since the blades are slightly flexible, the slot has a height slightly greater than the thickness of the blade, and a clamping means, such as a threaded member with a rounded end, will clamp and hold the blade by forcing it downwardly into a recess while forcing the edges of the blade upwardly into the upper shoulders of the slot. In this way, the blade is clamped securely in place. If desired, the end of the locking member can be pointed so as to penetrate slightly into or even through the surface of the blade for further secure retention. Also, the adapter can be provided with a tongue that allows the adapter to fit most, if not all, presently available saws.

BRIEF DESCRIPTION OF THE DRAWING

FIG. 3 is an end view of the adaptor and showing the position of the blade when it is clamped;

FIG. 4 is a perspective view of the adaptor; and

FIG. 5 is a perspective view of an embodiment of the adaptor.

DESCRIPTION OF THE PREFERRED EMBODIMENT OF THE INVENTION

Figure 1:
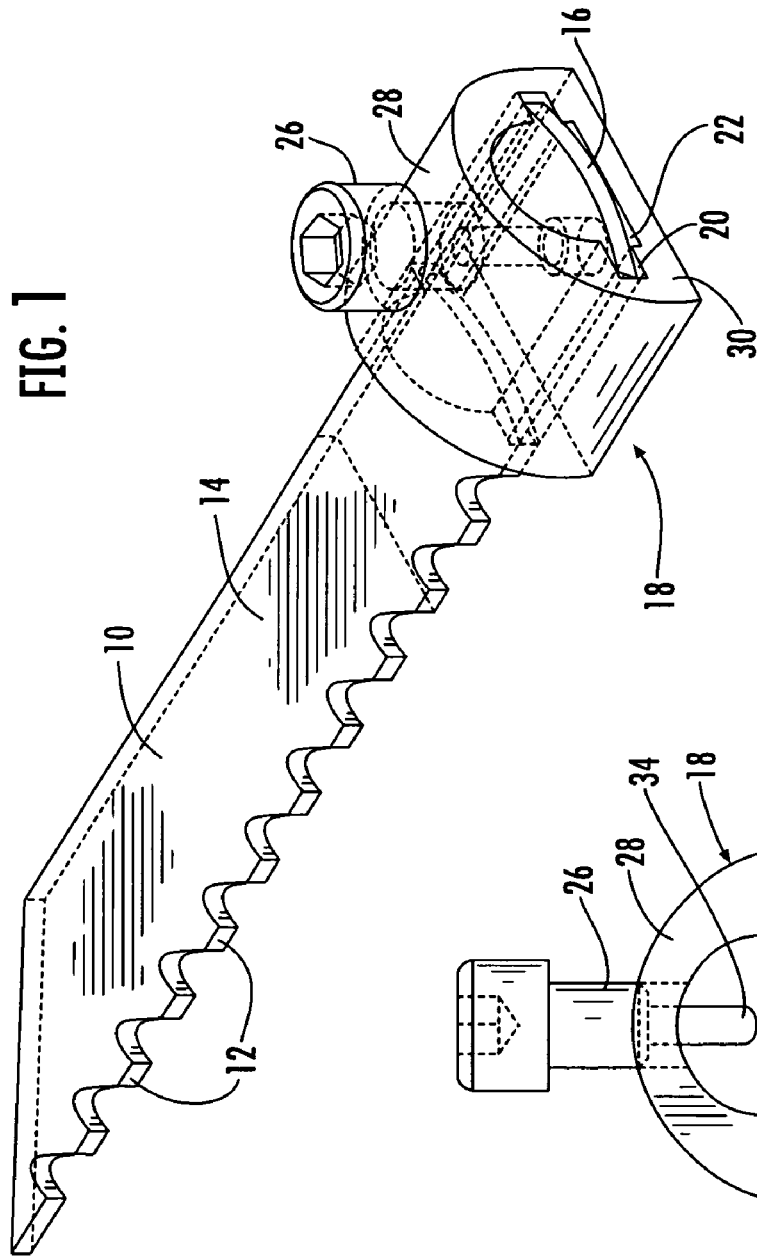
FIG. 1 is a perspective view showing a blade in place in the blade holding adaptor of the invention.
Figure 2:
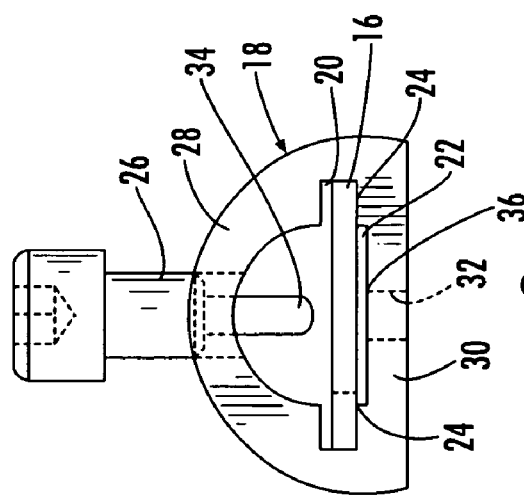
FIG. 2 is an end view of the adaptor with a blade in place prior to clamping of the blade.

Referring first to FIG. 1, there is shown a blade 10 of the type customarily used in reciprocating saws. Reciprocating saws and their use and operation are well known to those skilled in the art. One edge of the blade has a series of teeth 12, and the blade 10 typically is shaped to a point at the working end 14. At the non-working end 16, being the end opposite the working end 14, new blades typically are not produced with any teeth 12. Known blades for reciprocating saws however contain an opening in the non-working end that is used to secure the blade to the saw. All reciprocating saws have a blade holder that contains a slot to receive the non-working end of a blade. When a blade is to be inserted into the holder, the non-working end of the blade is inserted into the holder and a blade clamping screw or other locking device is tightened so that the shank on the end of a blade clamp screw goes through the hole in the blade and is threaded into the bottom of the blade holder.

In FIG. 1, there is illustrated an adaptor or blade holder designed according to the principles of the invention. The holder 18 can be mounted on the reciprocating saw in any suitable manner and contains a slot 20 extending through it to receive the non-working end 16 of the blade. Formed beneath the slot 20 is a groove 22 that extends the length of the slot 20. There is thus formed shoulders 24 between the slot 20 and groove 22. A threaded clamping screw 26 is threaded through the top portion 28 of the holder 18. The bottom portion 30 of the holder 18 includes an opening 32, which opening 32 could also be simply a depression in the bottom portion 30 directly beneath the groove 22. In either event, a shoulder 36 is formed around the opening 32.

As best illustrated in FIGS. 1 and 3, the non-working end of the blade 16 is inserted into the slot 20 until the edge of the non-working end 16 is beyond the opening 32. Since there is no hole through the non-working end 16 of the blade 10, it is not necessary that the alignment be precise as it is with the prior art blade holders. Once the non-working end 16 of the blade 10 is positioned in the slot 20, the clamping screw 26 is tightened until it engages the top surface of the blade 10. The clamping screw 26 is then further tightened to deflect the non-working end 16 downwardly into the groove 22 as shown in FIG. 3. At this time, the non-working end 16 of the blade 10 will be gripped by the shoulders 24 while the outer edges of the non-working end 16 will be deflected upwardly to engage the upper surface of the slot 20. Further tightening of the clamping screw 26 may also cause the shank 34 of the clamping screw 26 to penetrate the surface of the blade 10. In this regard, the end of shank 34 may be formed with a sharp point, and if the clamping screw 26 is tightened sufficiently, the point of the screw 26 can penetrate completely through the blade 10 into the opening 32. This will of course provide a positive grip of the blade 10 by the holder 18. When the non-working end 16 of blade 10 is thus deflected as shown in FIGS. 1 and 3 or penetrated through as described above, the shoulder 36 formed around the opening 32 will also tend to grip the blade 10.

In FIG. 5, there is illustrated another embodiment of the adaptor of the invention. In this embodiment, components corresponding to the embodiment of FIGS. 1-4 will be referred to using the same reference numerals followed by the letter "a". The holder 18a contains a slot 20a extending through it to receive the nonworking end of the saw blade in the same manner illustrated in FIG. 1 for the first embodiment. Formed beneath the slot 20a is a groove 22a that extends the length of the slot 20a thus forming shoulders 24a. The holder 18a has a top portion 23a through which a clamping screw (similar to screw 26 of the first embodiment) can be threaded. The bottom portion 30a contains an opening 32a directly beneath the groove 22a. Threading of the clamping screw in the manner described above for the first embodiment functions in the same way to securely hold the non working end of the saw blade. However, the holder 18a has an attachment tongue 40 rigidly attached to or formed integrally with the holder 18a, which tongue 40 extends outwardly in substantially the same plane as the slot 20a. The tongue 40 is shaped similar to the non working end of practically all know blades and thus provides for removable attachment of the holder 18a to all known saws.

Thus, the blade holder of the invention provides a means of firmly gripping and holding the blade 10 in a reciprocating saw. Because no precise alignment is required between a hole in the non-working end 16 of the blade 10 and an opening in the holder, changing of blades can be quick and easy. Moreover, should the blade break off at the non-working end 16, the clamping screw 26 can be loosened, the broken end portion removed and discarded, and the remaining end of the blade inserted into the slot 20 where it can be held by tightening of the clamping screw 26 as previously described. Thus, the invention allows broken blades to be reused and also allows easy attachment of new blades in reciprocating saws. With the prior art designs, broken and worn blades had to be discarded. The cost saving for using the adaptor of the invention is therefore significant.

Although the drawings have illustrated the use of a clamping screw, the principles of the invention can also be utilized with any type of a quick clamping design, threaded or not. Moreover, the adaptor is such that it can be used on all known reciprocating saws and jigsaws as well.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

What is claimed is:

1. A blade adaptor for attachment to a reciprocating saw having a removable saw blade having a working end with a cutting edge and a non-working end with no cutting edges, the non-working end of the saw blade being substantially rectangular with the no cutting edges being spaced apart to form a thin portion with first and second substantially parallel flat surfaces, the blade adaptor comprising:
 a blade holder having a top section defining an upper surface and a bottom section defining a flat surface opposite to the top section, a length and two side sections extending along the length and located on both sides of the upper surface;
 the blade holder further comprising a hollow section for receiving the non-working end of the saw blade;
 wherein the hollow section extends through the length of the blade holder;
 wherein the hollow section comprises a first U-shaped channel located at the bottom section, a second U-shaped channel located at the first side, and a third U-shaped channel located at the second side;
 wherein the first U-shaped channel comprises a first bottom surface located at a midsection of the bottom section and extends through and along the bottom section, and first and second walls extending perpendicular to the first bottom surface;
 wherein the second U-shaped channel comprises a second bottom surface, and third and fourth walls extending perpendicular to the second bottom surface;
 wherein the third U-shaped channel comprises a third bottom surface, and fifth and sixth walls extending perpendicular to the third bottom surface;
 wherein the first wall intersects the third wall at a right angle, and the second wall intersects the fifth wall at a right angle;
 wherein a threaded hole is provided at a midsection of the top section;
 wherein the second U-shaped channel and the third U-shaped channel receives the non-working end of the saw blade;
 wherein an arcuate concave surface joins the fourth and the sixth wall;
 a clamping member extending through the threaded hole of the top section into the first U-shaped channel to engage the first flat surface of the non-working end of the saw blade received in the second and third U-shaped channels;
 whereby tightening of the clamping member will hold the saw blade in the blade holder by deflecting the thin portion of the non-working end of the saw blade so that the first flat surface of the thin portion is urged against the fourth and sixth walls, and the second flat surface of the thin portion is urged against the third and fifth walls and the first bottom surface.

2. The blade adaptor of claim 1 in which the clamping member is a screw.

3. The blade adaptor of claim 1 in which the clamping member has a pointed end, whereby sufficient tightening of the clamping member will cause penetration of the pointed end into the first flat surface of the non-working end of the saw blade to further grip the saw blade in the holder.

4. The blade adaptor of claim 3 in which the clamping member is a screw.

* * * * *